UNITED STATES PATENT OFFICE.

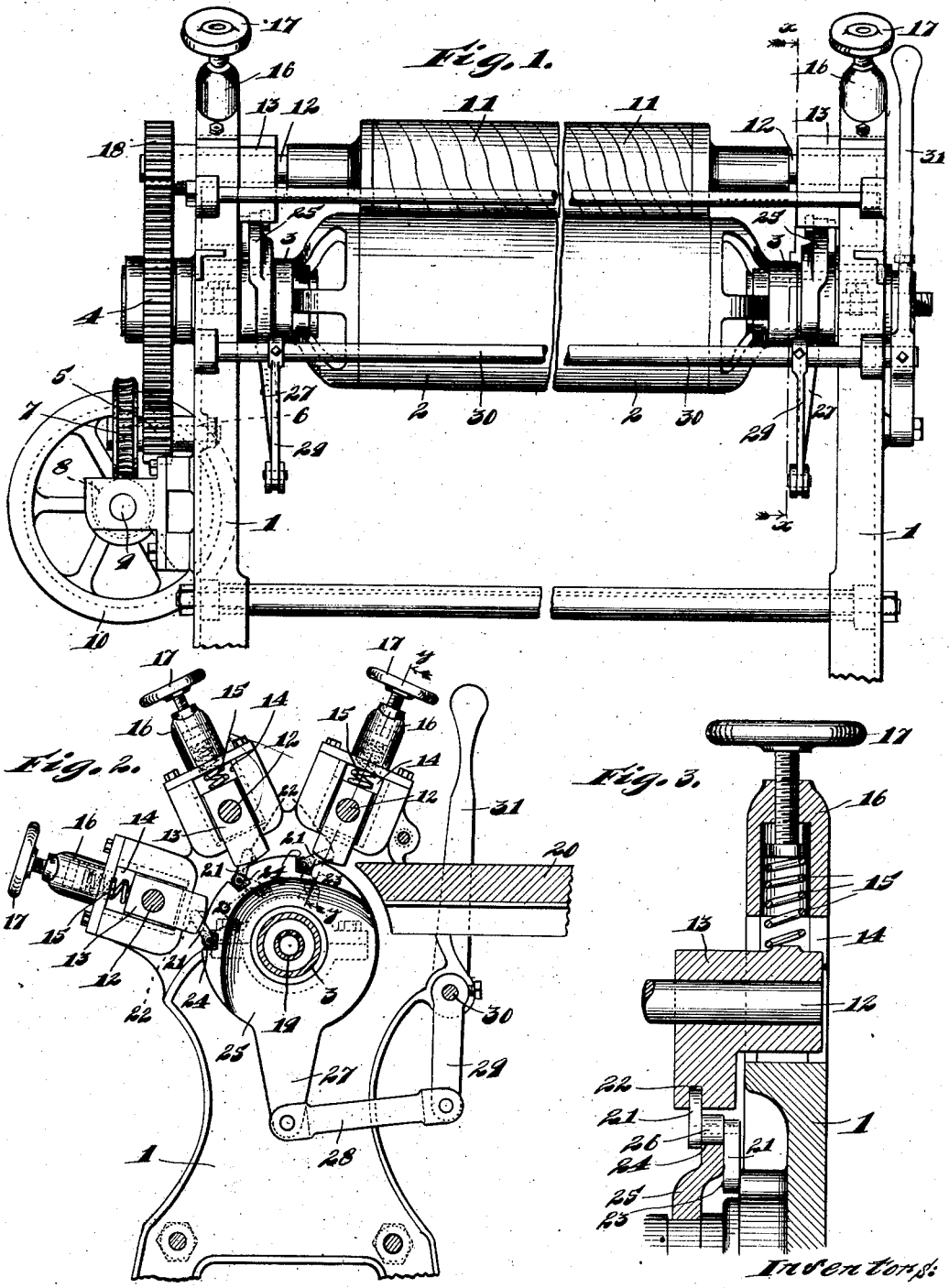

CLAES F. ROBERG AND AUGUST MALMBERG, OF CHICAGO, ILLINOIS.

LAUNDRY-MANGLE.

1,095,167.    Specification of Letters Patent.    Patented Apr. 28, 1914.

Original application filed October 30, 1912, Serial No. 728,565. Divided and this application filed June 19, 1913. Serial No. 774,511.

*To all whom it may concern:*

Be it known that we, CLAES F. ROBERG and AUGUST MALMBERG, citizens of the United States, and residents of the city of Chicago, county of Cook, and State of Illinois, have invented certain new and useful Improvements in Laundry-Mangles, of which the following is a specification.

Our invention relates to laundry mangles or pressing devices, the present application being a division of our pending application, Serial No. 728,565, filed October 30th, 1912, for mangles.

The object of our invention is the production of a machine of the character mentioned wherein will be provided means for readily and easily moving the movable or padded rollers included in the device, outwardly or from engagement with the heated roller, and for locking said movable or padded rollers in their outer positions.

A further object is the production of a mangle as mentioned which will be of durable and economical construction and efficient in use.

Other objects will appear hereinafter.

The invention consists in the combinations and arrangements of parts hereinafter described and claimed.

The invention will be best understood by reference to the accompanying drawing forming a part of this specification, and in which, Figure 1 is a front elevation of a mangle embodying our invention, the central portion thereof being broken away, Fig. 2 is a vertical transverse section taken on substantially line $x$—$x$ of Fig. 1, and Fig. 3 is an enlarged detail section taken on substantially line $y$—$y$ of Fig. 2.

The preferred form of construction as illustrated in the drawing comprises two spaced upright frame members 1 the lower portions of which, when the machine is in use, being securely fastened to the floor. Arranged between the upper ends of the frame members 1 is a heated roller 2 of the mangle the journals 3 at the respective ends of which are rotatably mounted in bearings provided therefor in said frame members 1. Provided upon one of the journals 3 is a gear 4 which meshes with a pinion 5 fixed to a stud shaft 6 rotatably mounted in the corresponding frame member 1. Also provided upon the shaft 6 is a worm wheel 7 which meshes with a worm 8 formed upon shaft 9 mounted as shown in bearings provided upon the outer side of the corresponding frame members 1. Also carried by the shaft 9 is a channel pulley 10 through the medium of which, when the machine is in use, driving of the machine is effected, a belt being adapted to travel around said pulley and connect with the source of power.

Arranged around the heated roller 2 is a plurality of movable or padded rollers 11 the journals 12 of which are rotatably mounted in bearing blocks 13 which are slidably mounted in slots 14 provided in the frame members 1 which are disposed radially relative to the axis of roller 2. Coöperating with said movable rollers are helical compression springs 15 the inner ends of which engage against the outer sides of bearing blocks 13, the outer ends of said springs being positioned in housings 16 and being engaged by adjusting screws 17 whereby the tension of said springs may be regulated. The springs 15 evidently serve to normally hold the rollers 11 in operative positions that is in contact with the periphery of roller 2, outward movement of said movable rollers being against the influence of said springs. Provided at corresponding ends of the rollers 11 are pinions 18 which mesh with the gear 4, an operative connection being thus established between the heated and padded rollers whereby simultaneous rotation thereof will be effected upon driving or rotation of the pulley 10.

Arranged within the heated roller is the usual tubular fuel burner 19 which, when the device is in use, is connected with any suitable source of fuel supply, the flames or jets which are supported by the fuel issuing from said burner serving to heat the roller 2.

At the front side of the machine is provided the usual table 20 from which the articles to be ironed are fed to position between the rollers 2 and 11, the upper side of said table being substantially tangential with the periphery of roller 2.

Coöperating with each of the bearing blocks 13 of the padded rollers are toggles 21 the outer ends of which loosely engage recesses 22 provided at the under or inner sides of said bearing blocks. The inner ends of said toggles are pivotally secured at 23 to the frame members 1, the respective extremities of said toggles being positioned in planes passing through the axes of said heated and movable rollers so that when said toggles are in extended or straightened positions, the same will be locked on dead center. Further, the arrangement is such that when said toggles are actuated or straightened as just mentioned the padded rollers 11 will be moved outwardly from engagement with the heated roller and will be locked in their outward positions by the locking of said toggles upon dead center. The knee joints of the toggles at opposite ends of the mangle engage notches or slots 24 provided in the periphery of a circular member 25 which is rotatably mounted upon an extension of the bearing for the journal 3 of the heated roller at the corresponding end of the machine. The arrangement is such that, upon clockwise oscillation of the member 25, the toggles 21 will be simultaneously actuated or straightened to cause outward movement of the padded rollers as just described. In order to lessen friction rollers 26 are preferably provided at the knee joints of the toggles for engagement with the sides of the notches 24 in this operation.

Depending from the actuating members 25 are arms 27 with which engage links 28 connected at their forward ends with rocker arms 29 depending from a rock shaft 30 the extremities of which are mounted in frame members 1. Thus the actuating members 25 at the opposite ends of the device are connected for simultaneous movement and so that, when the rock shaft 30 is oscillated, both ends of the padded rollers will be correspondingly moved. Provided at one end of the shaft 30 is an upwardly projecting handle or lever 31 whereby said shaft may be manually rocked to effect the desired movement of the padded rollers.

With the arrangement set forth, it will be seen that in the operation of the mangle, in the event of the rollers ceasing operation, the padded rollers may be readily and expeditiously moved out of engagement with the heated roller by simply rocking the lever 31. Through the use of toggles, great leverage results and so that rocking of the lever 31 to effect outward movement of the padded rollers may be effected with little exertion applied to said lever.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as fall within the scope of the appended claims.

Having described our invention what we claim as new and desire to secure by Letters Patent is:

1. In a mangle, the combination of a heated roller having stationary bearings; a plurality of movable rollers arranged around said heated roller and adapted to move toward and from the same; toggles connected with said movable rollers adapted, when actuated, to move said rollers; and rotatable actuating devices having slots engaging with the knee joints of said toggles, whereby, when said actuating devices are rotated, said toggles will be actuated to move said movable rollers, substantially as described.

2. In a mangle, the combination of a heated roller having stationary bearings; a plurality of movable rollers arranged around said heated roller and adapted to move toward and from the same; toggles connected with said movable rollers adapted, when actuated, to move said rollers; rotatable actuating devices having slots in their peripheries engaging with the knee joints of said toggles whereby, when said actuating devices are rotated, said toggles will be actuated to move said movable rollers; and a manually operable oscillatory member for rotating said actuating devices, substantially as described.

3. In a mangle, the combination of a heated roller having stationary bearings; a plurality of movable rollers arranged around said heated roller and adapted to move toward and from the same; toggles having their ends arranged substantially in planes passing through the axes of said heated and movable rollers and connected with said movable rollers so as to move the same when said toggles are actuated; and rotatable actuating devices having slots engaging with the knee joints of said toggles whereby, upon rotation of said devices, said toggles will be actuated, substantially as described.

4. In a mangle, the combination of a heated roller having stationary bearings; a plurality of movable rollers arranged around said heated roller and adapted to move toward and from the same; toggles having their ends arranged substantially in planes passing through the axes of said heated and movable rollers and connected with said movable rollers so as to move the same when said toggles are actuated; and rotatable actuating devices having slots engaging with the knee joints of said toggles whereby, upon rotation of said devices, said knee joint of each of said toggles will be moved into substantially the plane including the terminals thereof to cause outward movement of said movable rollers, substantially as described.

5. In a mangle, the combination of a heated roller having stationary bearings; a plurality of rollers arranged around said heated roller and having movably mounted bearings permitting of movement of said last mentioned rollers toward and from said heated roller; toggles coöperating with said movable roller bearings for moving said movable rollers away from said heated roller, corresponding ends of said toggles loosely engaging slots provided in said movable bearings, the opposite ends of said toggles being pivotally secured; and means for actuating said toggles, substantially as described.

6. In a mangle, the combination of a heated roller having stationary bearings; a plurality of rollers arranged around said heated roller and having movably mounted bearings permitting of movement of said last mentioned rollers toward and from said heated roller; toggles coöperating with said movable roller bearings for moving said movable rollers away from said heated roller, the respective ends of said toggles being disposed in planes passing substantially through the axes of said heated and movable rollers, corresponding ends of said toggles loosely engaging slots provided in said movable bearings, the opposite ends of said toggles being pivotally secured; and means for actuating said toggles, substantially as described.

In testimony whereof we have signed our names to this specification in the presence of two subscribing witnesses.

CLAES F. ROBERG.
    AUGUST MALMBERG.

Witnesses:
 ARTHUR A. OLSON,
 HELEN F. LILLIS.